United States Patent [19]

Blazey

[11] Patent Number: 4,499,437
[45] Date of Patent: Feb. 12, 1985

[54] APPARATUS AND METHOD PROVIDING IMPROVED CONTROL OF A LASER BEAM

[75] Inventor: Richard N. Blazey, Penfield, N.Y.

[73] Assignee: Eastman Kodak Company, Rochester, N.Y.

[21] Appl. No.: 281,266

[22] Filed: Jul. 8, 1981

[51] Int. Cl.³ .......................... G02F 1/32; H04B 9/00; H01S 3/10
[52] U.S. Cl. .................................. 332/7.51; 350/358; 350/355; 346/108; 358/347
[58] Field of Search ............... 332/7.51; 350/358, 355, 350/356, 6.1, 6.5; 354/5; 358/302, 347; 365/123; 340/783; 346/108

[56] References Cited

U.S. PATENT DOCUMENTS

| Re. 31,334 | 8/1983 | Spaulding et al. | 350/358 |
|---|---|---|---|
| 3,863,262 | 1/1975 | Crofut et al. | 354/5 |
| 3,869,197 | 4/1975 | Owens et al. | 350/358 |
| 4,150,880 | 4/1979 | Howe et al. | 350/358 |
| 4,164,717 | 8/1979 | Blazey | 332/7.51 |
| 4,277,154 | 7/1981 | Sakabinos | 350/6.7 |
| 4,305,646 | 12/1981 | Bechtold | 350/6.7 |
| 4,321,551 | 3/1982 | Bleil et al. | 330/4.3 |
| 4,344,677 | 8/1982 | Stuermer et al. | 354/5 |
| 4,367,926 | 1/1983 | Hahki | 350/358 |
| 4,390,875 | 6/1983 | McNaney | 350/358 |

OTHER PUBLICATIONS

Blazey et al., "High Quality Laser... Scanning", 12/80, pp. 144-146, J. Appl. Photogr. Eng., vol. 6, #6, abst. only.
Grossman, "How to Select Acousto-Optic Modulators", 4/83, pp. 49-53, Laser Focus.
"Acoustooptic Scanning" by H. J. Aronson, Laser Focus, Dec. 1976, p. 36.
"Laser-Optical System of the IBM 3800 Printer" by J. M. Fleischer et al., IBM J. Res. Develop., Sep. 1977, p. 479.
"Modulation Transfer Characteristics of an Acoustooptic Detector" by R. Randolph et al., Applied Optics, vol. 10, No. 6, pp. 1383-1385.
"Acoustic Surface Wave and Acousto-Optic Devices", Kallord, T. (ed.), pp. 151-162, (1971).
"Optical Character Generation for a High-Speed Non-Impact Printer" by W. Meye, The Journal of Photographic Science, vol. 25, 1977, p. 184.

Primary Examiner—Nelson Moskowitz
Attorney, Agent, or Firm—John D. Husser

[57] ABSTRACT

The present invention provides method and apparatus for angularly deflecting and intensity modulating a laser beam. Specifically, an acousto-optic cell is driven by a signal that causes a laser beam incident thereon to be deflected through an angular range $\Delta\theta$ and intensity modulated in accordance with a number of pixels $N_{pix}$ of information per angular deflection range $\Delta\theta$. The number of pixels $N_{pix}$ per angular range $\Delta\theta$ is, in accordance with the invention, substantially larger than a resolution parameter $N_{res}$ defined by $$N_{res} = \frac{\Delta f D}{\epsilon V_s} + 1,$$

where $\Delta f$ is the frequency range in the drive signal which produces the angular deflection $\Delta\theta$, D is the effective diameter of the incident laser beam, $V_s$ is the acoustic velocity of the acousto-optic cell, and $\epsilon$ is a constant referred to as the "beam separation constant" and is defined below.

27 Claims, 7 Drawing Figures

APPARATUS AND METHOD PROVIDING IMPROVED CONTROL OF A LASER BEAM

BACKGROUND OF THE INVENTION

1. Field of the Invention

The present invention relates to laser writing apparatus and, more particularly, to method and apparatus for using a laser beam to expose information on a recording material at a relatively high speed with high resolution.

2. Description Relative to the Prior Art

An acousto-optic cell is a device which can be used to provide controlled angular deflection and/or intensity modulation of a laser beam. A typical acousto-optic cell is comprised of an acousto-optic material having a transducer mounted thereto which converts an electrical drive signal into an acoustic wave. The acoustic wave then travels through the acousto-optic material and produces periodic variations in its index of refraction. Such periodic index variations cause a laser beam incident thereon to be diffracted into a fan-like array of beams wherein the angular positions and relative intensities of the diffracted beams depend on the frequency and amplitude content, respectively, of the acoustic wave.

It is well known that if the laser beam is incident at an angle known as the Bragg angle $\theta_B$, it can be diffracted into only two beams, an undeflected zero order beam and a deflected first order beam. In this case, the first order beam is deflected relative to the zero order beam at an angle $2\theta_B$ which is equal to twice the Bragg angle. Quantitatively, the deflection angle $2\theta_B$ is given (for small angles) as $$2\theta_B = \lambda f/V_s, \quad (1)$$

where $\lambda$ is the wavelength of laser radiation, f is the frequency of the acoustic wave, and $V_s$ is the acoustic velocity, i.e., the speed of the acoustic wave in the acousto-optic material. See, for example, "Acousto-optic Scanning" by H. J. Aronson, Laser Focus, December 1976, p. 36. Because the deflection angle $2\theta_B$ is dependent on the frequency of the acoustic wave, the angular position of the deflected beam can be made to vary by varying the frequency of the signal used to drive the acousto-optic cell.

In addition to deflecting a laser beam through an angular range, an acousto-optic cell can also be used to intensity modulate the deflected beam. This is done by varying the amplitude of the acoustic wave. Specifically, the ratio of beam energy which is diffracted into the deflected first order beam to that in the undeflected zero order beam is proportional to the amplitude of the acoustic wave. Amplitude modulation of the drive signal, therefore, results in a corresponding intensity modulation of the deflected first order beam. (Even though the zero order beam is also intensity modulated, it is generally not used for laser writing because, unlike the first order beam, it cannot be deflected by varying the frequency of the drive signal.)

In laser writing apparatus, acousto-optic cells are used to angularly deflect and intensity modulate a laser beam in accordance with an information signal derived from a document scanner or other information source. The deflected and modulated laser beam is then used to "write" (i.e., expose) such information on a recording material. The performance of an acousto-optic cell in such applications is measured in terms of writing speed and image resolution. The term writing speed refers to how fast information can be written on the recording material and is thus a direct measure of the number of documents per hour which can be produced. A parameter which is a measure of the writing speed of an acousto-optic cell used as a modulator is the access time $\tau$ which is a measure of the length of time required for an acoustic wavefront to traverse the incident laser beam. The access time $\tau$ is quantitatively defined as $$\tau = D/V_s \quad (2)$$

where D is the effective diameter of the incident laser beam and $V_s$ is the acoustic wave velocity. Because the intensity of the deflected laser beam is varied by changing the amplitude of the drive signal (and thus of the acoustic wave), the access time $\tau$ is a measure of how quickly the deflected laser beam can be modulated, i.e., turned "on" and "off."

The resolution capability of an acousto-optic cell is determined by the angular divergence of the deflected first order beam and is a measure of the number of resolved spots that can be written within a given range of angular deflection. Specifically, the number of resolved spots is determined by a resolution parameter, hereinafter denoted as $N_{res}$, which is the ratio of the total angular range through which the first order beam is deflected to the angular divergence of the deflected beam. The resolution parameter $N_{res}$ is given analytically by the equation $$N_{res} = \frac{\Delta f \tau}{\epsilon} + 1, \quad (3)$$

where $\tau$ is the access time of the acousto-optic cell used for deflection (defined by equation 2), $\Delta f$ is the frequency range of the drive signal, and $\epsilon$ is a constant referred to hereinafter as the beam separation constant. The beam separation constant $\epsilon$ depends on the intensity profile of the incident laser beam, the diffracting aperture of the acousto-optic cell, and the criterion used for resolution. In the case of a uniformly illuminated diffracting aperture wherein a resolution criterion known as Rayleigh's criterion (discussed below) is assumed, the beam separation constant has a value of 1.0. In applications wherein the illumination is non-uniform (such as produced by a gaussian profile laser beam), or where a different resolution criterion is assumed, the beam separation will have different values, generally in the range of 1.0 to 1.4. For example, the article by Aronson cited above gives, at page 38, values of $\epsilon$ for a uniform-intensity rectangular beam ($\epsilon = 1.0$), a uniform-intensity circular beam ($\epsilon = 1.22$), and a gaussian beam clipped at the $1/e^2$ intensity points ($\epsilon = 1.34$). It has been believed that the number of pixels (i.e., spots) $N_{pix}$ that can be written along a column which results from angularly deflecting the first order beam is equal to the number of resolved spots within the angular range, i.e., $$N_{pix} = N_{res}$$

In the case where separate acousto-optic cells are used for deflection and modulation, the number of resolved spots $N_{res}$ defined by equation 3 and the access time $\tau$ defined by equation 2 are independent, and laser writing apparatus can be designed which has both high speed and high resolution. See, for example, "Laser-Optical System of the IBM 3800 Printer" by J. M. Fleischer et al, IBM J. Res. Develop., September 1977, page 479. In those applications (see, for example, U.S.

Pat. No. 3,863,262) where a single acousto-optic cell is used for both deflection and modulation, however, the access time which determines the writing speed (equation 2) also affects the resolution parameter $N_{res}$ (equation 3). In particular, to maximize the resolution parameter $N_{res}$, it is desirable to make the access time $\tau$ as large as possible (see equation 3); but to maximize the writing speed it is necessary to be able to rapidly modulate the deflected laser beam, which implies an access time $\tau$ (given by equation 2) that is as small as possible. Obviously, both conditions cannot be satisfied simultaneously.

A solution to this problem is given in U.S. Pat. No. 4,164,717 which discloses an acousto-optic cell of complex construction which, when used with a sophisticated optical system having cylindrical lens elements, enables high speed and high resolution to be obtained even though a single acousto-optic cell is used to both deflect and modulate an incident laser beam. Apart from the fact that the disclosed acousto-optic cell is relatively difficult to manufacture, the major benefits of single cell operation i.e., low-cost and inherent simplicity, are lost in that system because of its complexity.

SUMMARY OF THE INVENTION

The present invention provides method and apparatus for controlling the deflection and modulation of a laser beam using a single acousto-optic cell of conventional construction. Moreover, as discussed in detail below, certain basic design rules of the prior art are violated to enable the disclosed system to operate at the same resolution as prior art single cell systems but at a substantially faster writing speed, or at the same writing speed but at significantly improved resolution, or at a combination of both.

Generally, such results are achieved by angularly deflecting a laser beam through an angular range $\Delta\theta$ and by intensity modulating the deflected beam in accordance with a number of pixels $N_{pix}$ of information per angular deflection range $\Delta\theta$, which number of pixels $N_{pix}$ is substantially greater than a resolution parameter $N_{res}$ defined as $$N_{res} = \frac{\Delta f D}{\epsilon V_s} + 1,$$

where $\Delta f$ is the frequency range in the drive signal which produces the angular deflection $\Delta\theta$, D is the effective diameter of the incident laser beam, $V_s$ is the acoustic velocity of the acousto-optic cell, and $\epsilon$ is the beam separation constant.

BRIEF DESCRIPTION OF THE DRAWINGS

In the detailed description of the preferred embodiments of the invention presented below, reference is made to the accompanying drawings, in which.

DETAILED DESCRIPTION OF THE PREFERRED EMBODIMENTS

Figure 1:
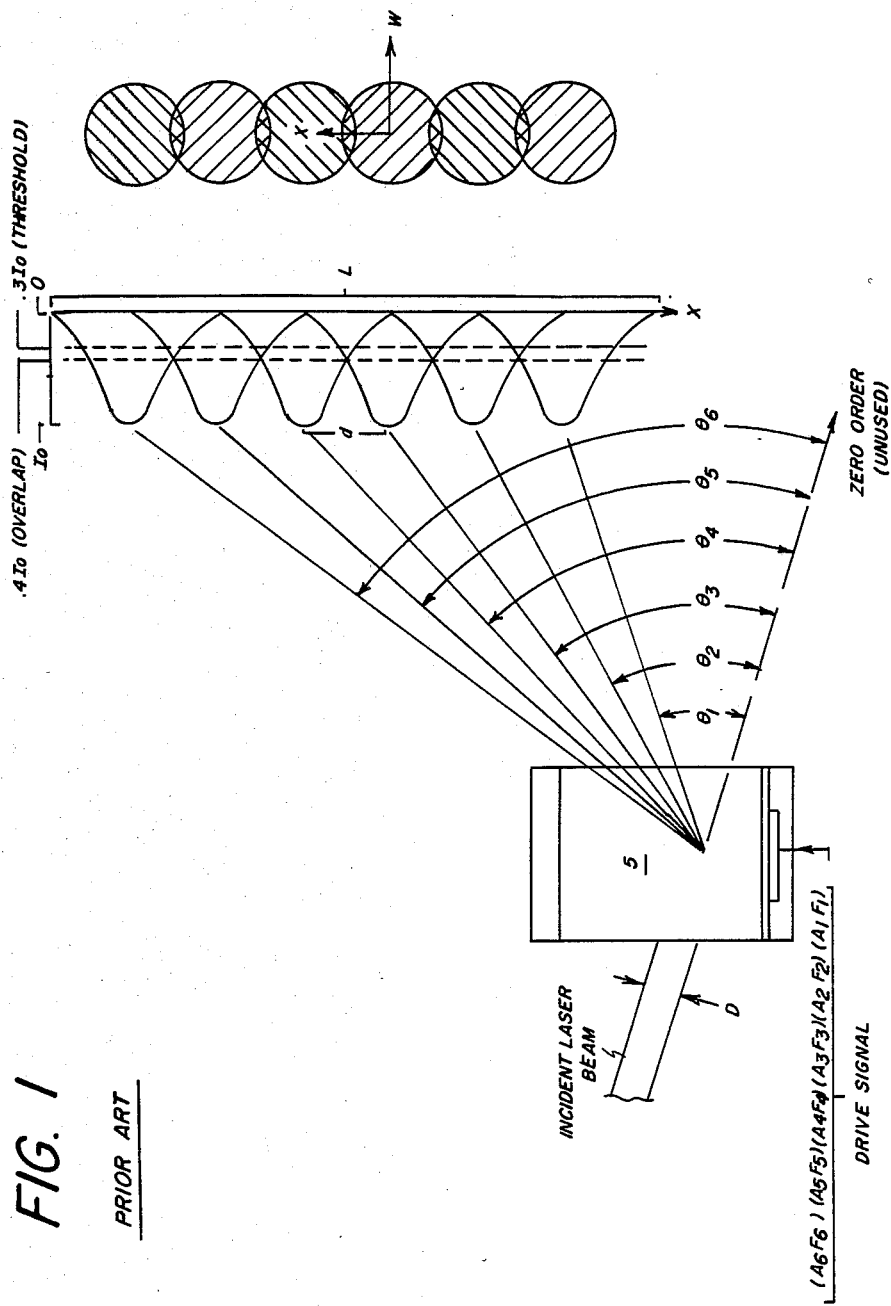
FIG. 1 illustrates the operation of an acousto-optic cell in accordance with prior art teachings.

FIG. 1 illustrates the operation of an acousto-optic cell 5 in accordance with prior art teachings. For purposes of illustration, a drive signal is shown that is comprised of a series of frequency components $F_1$ through $F_6$, each of which has a respective amplitude $A_1$ through $A_6$. Alternatively, the drive signal may be comprised of a continuously varying frequency function $F(t)$ which is modulated by a time varying amplitude function $A(t)$. Because certain concepts basic to an understanding of the present invention are more easily illustrated assuming a drive signal of the form having a series of frequency components, this form of drive signal will be assumed in the discussion relating to FIGS. 1 and 2. (It will be apparent to those of ordinary skill in the art, however, that the basic concepts of the present invention are applicable to both types of drive signals.) Each frequency component $A_i F_i$ (i=1 through 6) causes the incident laser beam to be deflected at an angle $\theta$ (i=1 through 6) relative to the undeflected zero order beam. The first order beam is thus deflected at an angle $\theta_1$ for the duration of the $A_1 F_1$ component of the drive signal, then at an angle $\theta_2$ for the duration of the $A_2 F_2$ component, and so on to angle $\theta_6$ for the duration of the $A_6 F_6$ component. The intensity level of the deflected beam at each angular position is determined by the amplitude of the frequency component of the drive signal that produced the deflection. In general, therefore, the deflected beam will assume different intensities as it is deflected through the various angular positions ($\theta$ to $\theta_6$), such intensity variations corresponding to information contained in the amplitude variations of the drive signal.

For reasons which are discussed below, it is preferable that the recording material be a high contrast recording material characterized by a characteristic slope greater than about 2. (The term "characteristic slope" denotes the slope of the characteristic curve, e.g., the density versus log exposure curve, of the recording material.) By virtue of the high contrast of the recording material, thresholding occurs in that a recorded image area has either a high density level (exposure is above the threshold level) or a low density level (exposure is below the threshold level). Accordingly, the amplitudes $A_1$ through $A_6$ are such as to cause the deflected beam to be either turned "on" (produce an image at the high density level) or "off" (produce an image at the low density level). For purposes of illustration, it is assumed in FIG. 1 that all amplitude components are equal and correspond to the "on" state of the deflected writing beam.

As illustrated in FIG. 1, the intensity profile of the writing beam at each angular location is a gaussian profile and is given by the equation $$I = I_o e^{-cx^2} \quad (4)$$

where $I_o$ is the intensity at the center of the beam, c is a parameter which determines the lateral spread of the beam, and x denotes radial distance from the beam center. The gaussian nature of the writing beam follows from the gaussian nature of the incident laser beam, as well as from the absence of diffracting apertures which would change the intensity profile. While other beam profiles are equally useful in laser writing systems, the present discussion assumes a gaussian beam profile because it is the most commonly used.

Because the gaussian beam profile does not have a sharp cutoff, and because the beam can be truncated by the acousto-optic cell, the definition of the associated beam diameter D is somewhat arbitrary. In the environment of the present invention, the diameter of concern is the effective diameter of the laser beam as seen by the acousto-optic cell. Thus, if the acousto-optic cell is so small as to severely truncate the incident laser beam, the effective diameter D is related to the physical dimensions of the acousto-optic cell. On the other hand, if the acousto-optic cell is large compared to the size of the laser beam, the effective diameter D will be determined by its intensity profile. In this case, a widely used definition of the effective beam diameter D is based on the diameter of the beam measured from the points at which the beam intensity drops to $1/e^2$ ($e = 2.71828$) of its central intensity. See "Modulation Transfer Characteristics of an Acoustooptic Detector" by R. Randolph et al, Applied Optics, Vol. 10, No. 6, pp. 1383-1385.

From the standpoint of obtaining high resolution, it is desirable to pack as many angular beam locations within a given deflection range as possible. Because the deflected writing beam has a gaussian intensity profile, however, each beam location is not infinitesimally small and angular locations are spaced apart by an amount sufficient to allow adjacent beams to be resolved. In accordance with prior art design principles this minimum separation is determined by a resolution criterion such as the well known Rayleigh criterion for resolution which specifies the minimum separation at which two beams can be resolved. For gaussian beams, this separation results in the intensity profiles overlapping at about 40 percent of the maximum beam intensity level, i.e., $0.4I_o$. This is the condition of overlap shown in FIG. 1. It is this condition of overlap that is inherent in equation 3 above, which gives the resolution parameter (i.e., number of resolved spots per total deflection angle) as $$N_{res} = \frac{\Delta f D}{\epsilon V_s} + 1.$$

(A more detailed discussion of the Rayleigh criterion and its relation to the resolution parameter $N_{res}$ is provided in "Acoustic Surface Wave and Acousto-Optic Devices", Kallard, T. (ed.) pp. 151-162 (1971). In terms of the system shown in FIG. 1, $\tau$ is the access time of the acousto-optic cell 5, $\Delta f$ is the frequency difference between the $F_1$ and $F_6$ frequency components, and the beam separation constant $\epsilon = 1.34$ (gaussian beam). Thus, for the set-up depicted in FIG. 1, six angular positions of the writing beam are resolved over an angular deflection range $\Delta\theta = \theta_6 - \theta_1$. In terms of the image written on the recording material, six pixels will be written per column length L. (The term "pixel" is used to refer to one bit, or segment, of information to be exposed on the recording material.) The size of a written pixel is determined by the effective threshold level of the system which, in FIG. 1, is shown as occurring at the $0.3I_o$ level, thereby giving rise to an overlapping pixel pattern qualitatively represented by the overlapping shaded areas.

In addition to resolution, which determines image quality, it is important, for purposes of understanding the invention, to determine the speed at which the prior art system discussed above can write the column of pixels shown in FIG. 1. In general, the time required to write a column of pixels is determined by the number of pixels in the column and the time required to write each pixel. Denoting the time required to write a column as $T_c$, the time required to write each pixel as $T_{pix}$, and the number of pixels in the column as $N_{pix}$ (which is equal to the number of resolved spots $N_{res}$ calculated from equation 3), then $$T_c = N_{pix} T_{pix}. \tag{5}$$

The pixel time $T_{pix}$ is limited by the access time $\tau$ of the acousto-optic cell which, as discussed above, is a measure of how fast the writing beam can be turned "on" and "off." Accordingly, the pixel time $T_{pix}$ may be expressed as $$T_{pix} = \zeta\tau, \tag{6}$$

where $\zeta$ is a constant which, in accordance with the prior art, is selected to have a value greater than about 2, it being recognized that lower vales of $\zeta$ result in decreased modulation of the laser beam as well as a loss in exposure. See, for example, "Optical Character Generation for a High-Speed Non-Impact Printer" by W. Meye, The Journal of Photographic Science, Vol. 25, 1977, p. 184. This selection of $\zeta$ is hereinafter referred to as the "zeta rule." The minimum pixel time $T_{pix}$ is thus given by $$T_{pix} = 2\tau. \tag{7}$$

Using equation 6, the column time $T_c$ given by equation can be written as $$T_c = N_{pix}\zeta\tau(\zeta \geq 2). \tag{8}$$

Accordingly, the shortest time in which a column of pixels can be written is $$T_c = 2N_{pix}\tau. \tag{9}$$

It is important to realize that while equation 9 predicts that a decrease in the access time $\tau$ will decrease the column time $T_c$ (and thus increase the writing speed), this increase in writing speed occurs only at the expense of resolution. This is because the number of resolved spots $N_{res}$, and thus the number of pixels $N_{pix}$, in the written column is itself a function of the access time (see equation 3), and, because of this relationship, a decrease in $\tau$ results in a concomitant decrease in the number of pixels per column, $N_{pix}$.

In accordance with the present invention, improved operation of the laser writing system depicted in FIG. 1 is obtained by violating certain of the established design rules discussed above, and by using a recording material which is a high contrast recording material. Specifically, as discussed in detail below, the above-discussed laser writing system can be made to operate at the same resolution but at a substantially higher writing speed, at the same writing speed but at a substantially higher resolution, or at both a higher resolution and a higher writing speed.

In contrast to the prior art teaching that the number of pixels per column $N_{pix}$ is equal to the number of resolved spots per column $N_{res}$, the present invention provides laser writing apparatus wherein the number of pixels per column is substantially greater than the number of resolved spots per column, i.e., $$N_{pix} > N_{res}. \tag{10}$$

The condition expressed in equation 10 would seem to imply, based on the prior art teachings discussed above, that adjacent pixels are not resolved since there are more pixels per column than resolved spot locations. It has nevertheless been discovered that laser writing apparatus which is operated in accordance with this condition writes alphanumeric characters and/or like symbols at the same or better quality than prior art systems, and does so at substantially higher writing speeds. The phrase "alphanumeric characters and/or like symbols" is used hereinafter to refer generally to alphanumeric characters, forms, logos, and other non-continuous tone subject matter.

Figure 2:
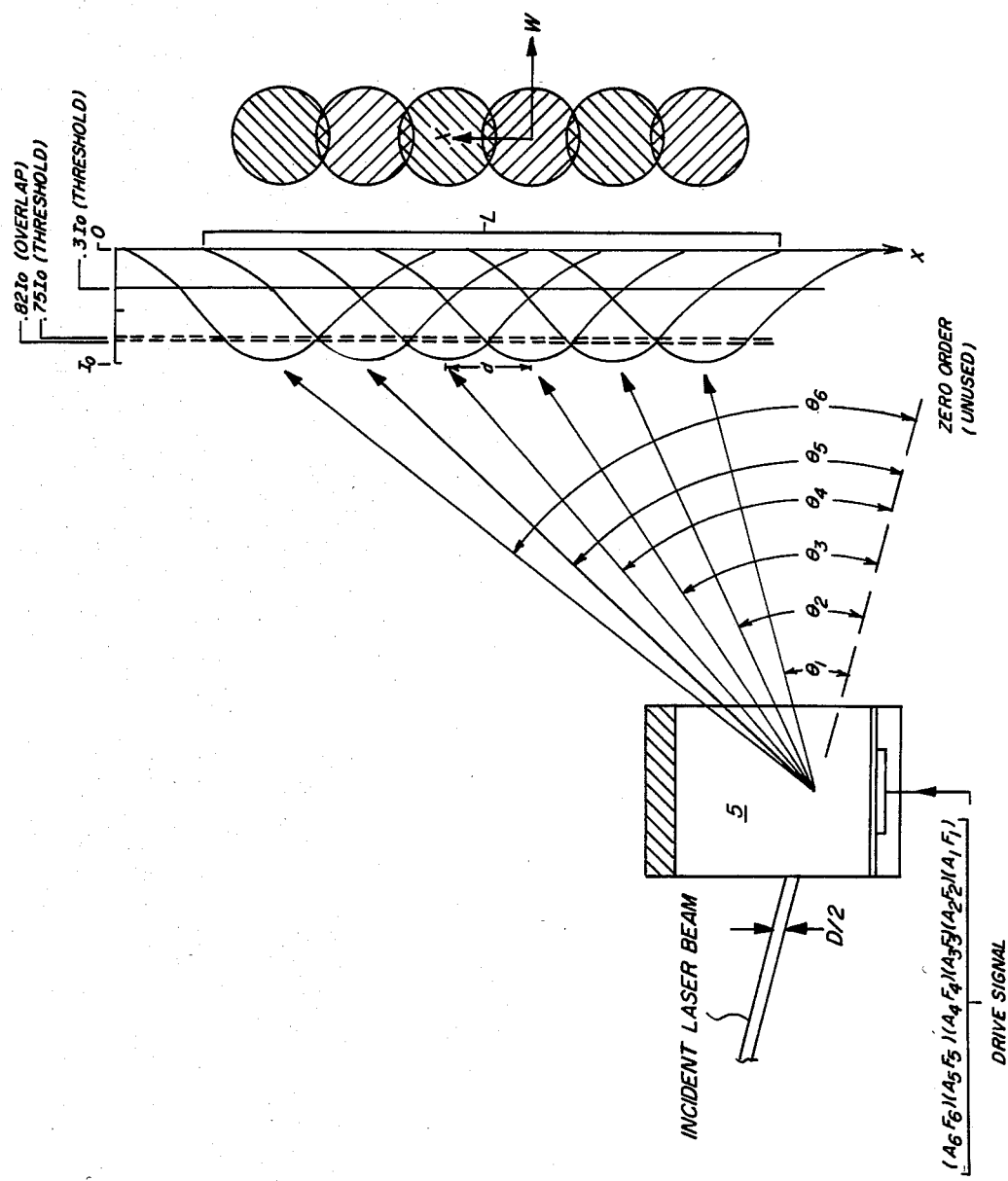
FIG. 2 illustrates the operation of an acousto-optic cell in accordance with the present invention.

FIG. 2 illustrates the operation of the acousto-optic cell 5 in accordance with the general concepts of the present invention. The access time $\tau$ given by equation 2 as $\tau = D/V_s$ is reduced, say by a factor of 2, by halving the diameter D of the incident laser beam. The effect of such a reduction in the access time $\tau$ is to broaden the gaussian intensity profile of the writing beam. In accordance with the prior art teachings, the resolution parameter $N_{res}$ (number of resolved spots), and thus the number of pixels, should decrease since, by equation 3, $$N_{pix} = N_{res} = \frac{\Delta f \tau}{\epsilon} + 1.$$

Specifically, halving the access time $\tau$ will, according to the prior art, reduce $N_{res}$ (and $N_{pix}$) by a factor of about 2. In accordance with the present invention, however, the number of pixels $N_{pix}$ per angular deflection range is not reduced, even though the resolution parameter $N_{res}$ is reduced by the reduction in access time $\tau$. This is accomplished, in the system depicted in FIG. 2, by driving the acousto-optic cell 5 with a drive signal having the same frequency components ($F_1$ through $F_6$) as was used in the system depicted in FIG. 1. (In the case of a continuous frequency drive signal, the writing beam would be turned "on" and "off" at a rate which causes six pixels of information to be written along the column length "L".) In order to preserve the pixel size, the effective threshold level of the system is raised to about 0.75 $I_o$ by decreasing the laser beam power.

In accordance with a further aspect of the invention, a further increase in writing speed is obtained, without sacrificing image quality, by violating the "zeta rule" discussed above. Specifically, the "zeta rule" requires that the time spent in writing each pixel be at least twice the access time of the acousto-optic cell, i.e., $T_{pix} > 2\tau$ (see equation 7) since shorter pixel times result in decreased modulation of the writing beam and a loss of exposure. Even so, it has been found that the pixel time can be reduced to approximately equal the access time if the recording material is a high contrast material. In accordance with this aspect of the invention, therefore, $$T_{pix} = \tau. \tag{11}$$

Because the pixel time $T_{pix}$ is proportional to the writing speed (see equation 8, for example), this aspect of the invention results in a two-fold increase in writing speed and, for reasons discussed below, does not result in a loss of image quality.

As discussed above, laser writing apparatus in accordance with the invention operates in such a manner as to violate certain design rules which are basic to the prior art. While it is not completely understood why significant advantages result from violating certain well established design rules, it is believed that operation of laser writing apparatus in accordance with the present invention provides an image irradiance pattern that is more compatible with the writing of alphanumeric characters and like symbols on a high contrast recording material. As a result, the advantages of a faster writing speed, better image quality, or both, are obtained.

As a specific implementation of the above-discussed concepts, reference is now made to FIGS. 3 through 7 which collectively illustrate a presently preferred embodiment of the present invention.

Figure 3:
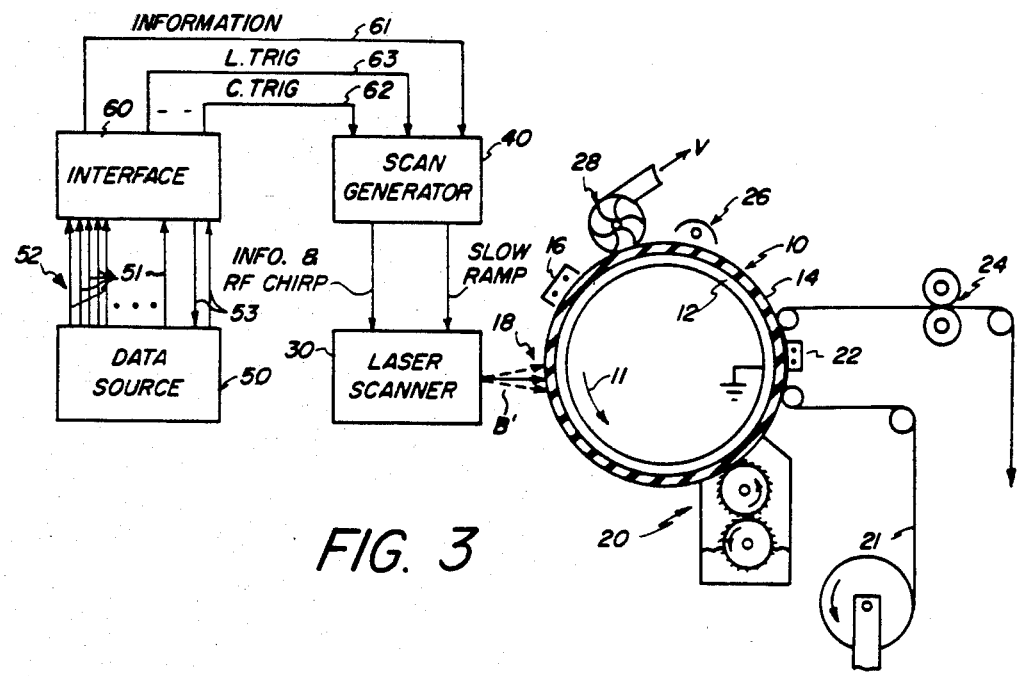
FIG. 3 is a schematic illustration of a laser writing system in accordance with the present invention.

FIG. 3 schematically illustrates laser writing apparatus in which images of alphanumeric characters and/or like symbols such as forms, logos, etc., are formed on the photosensitive surface of a high contrast recording material in the form of a cylindrical recording element 10. In this case, the recording element 10 is of the type used in conventional electrophotographic recorders comprising an electrically grounded cylindrical drum 12 which supports a photoconductive layer 14. Means, not shown, are provided for rotating the recording element 10 at a constant speed in the direction of arrow 11.

Transferrable toner images are formed on the photoconductive surface of the recording element 10 by the basic electrophotographic recording process: First, an electrostatic image is formed on the photoconductive layer of the recording element 10 by applying a uniform electrostatic charge to the photoconductive surface at a charging station 16, and then imagewise exposing the uniformly charged surface to actinic radiation at an exposure station 18. The exposure step serves to selectively dissipate the uniform charge, leaving behind a latent electrostatic image which is a mirror image of the information which is to be printed. This latent image is then rendered visible at a developing station 20 by applying electroscopic toner particles thereto.

After development of the latent electrostatic image on the recording element 10, the developed image is transferred to a receiving member 21, such as plain paper support, at a transfer station 22. Thereafter, the transferred toner image is bonded to the receiving member at a fusing station 24 by the application of heat and pressure. After transferring the toner image to the receiving member 21, the photoconductive surface of the recording element 10 is uniformly illuminated by a lamp 26 to dissipate electrostatic charges which may attract residual toner particles to the surface. The residual toner is then removed by a rotating brush 28 to which a vacuum V is applied. In this manner, the recording element 10 is readied for another cycle of operation.

Imagewise exposure of the photoconductive recording element 10 is effected by an intensity-modulated laser beam B' which, by means of a laser scanner 30, is scanned across the recording element's photosensitive surface. The position at which the laser beam strikes the photosensitive surface is controlled by electrical signals supplied to the laser scanner by a scan generator 40. The intensity of the laser beam is controlled by the output of a data source 50 (disclosed in more detail below and in U.S. Pat. No. 3,864,697, which is hereby incorporated by reference) which, by means of interface 60, provides an information signal 61 indicative of the information to be recorded to scan generator 40. The laser scanner 30, in a manner described in more detail below, exposes an entire line of alphanumeric characters on the recording element 10 during each horizontal sweep of the beam (i.e., a sweep parallel to the axis of rotation of the recording element) by rapidly and repetitively deflecting the laser beam vertically through a small angular range while simultaneously deflecting the beam horizontally at a substantially slower rate. During each upward stroke of the laser beam, one vertical column of picture elements (i.e. "pixels") of a desired character or the like is written on the recording element 10, each pixel corresponding to the image produced by a respective modulation state (e.g., an "on" or "off" state) of the laser beam.

Figure 4:
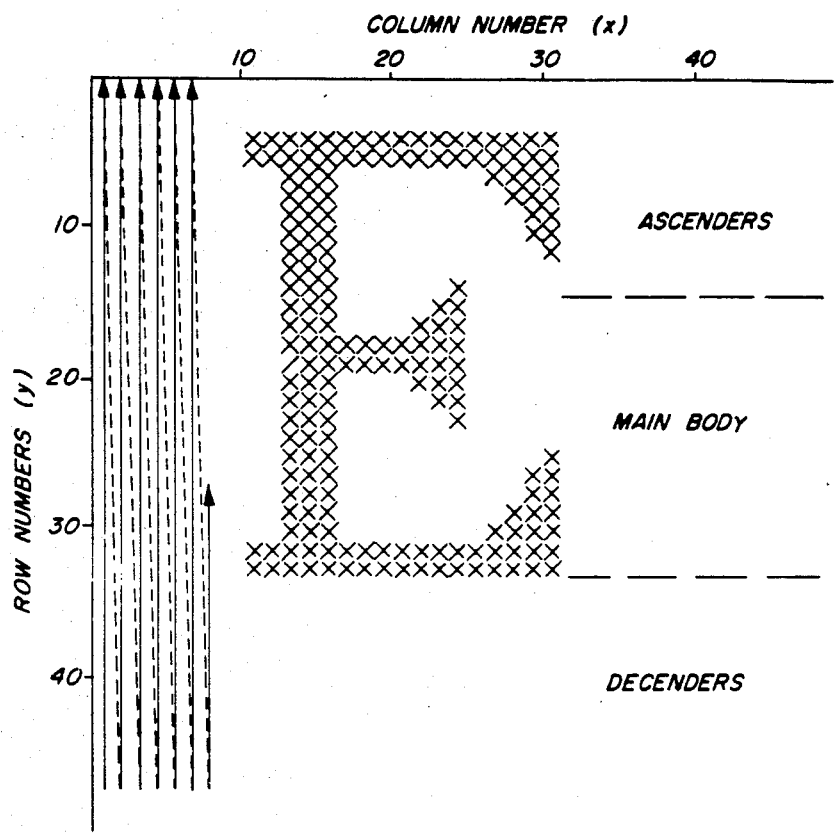
FIG. 4 illustrates the scan raster provided by the laser writing apparatus shown in FIG. 3.

As may be best appreciated by referring to FIG. 4, each character (or incremental area of a form, picture, logo, etc.) to be printed is represented by a unique arrangement of "on" or "off" pixels arranged in an x-y matrix. Each character is comprised of 48 horizontal rows (y) and a variable number of columns (x), depending on the width of each character. Each pixel location thus has a unique pair of locators (x,y). Three rows at the top and bottom of the matrix are reserved for the spacing between adjacent lines of characters. Approximately twelve rows between the main body portion of the characters and the top and bottom margins are used to print characters having ascenders (e.g. upper-case letters and certain lower-case letters; such as h, k and b) and descenders (e.g. lower case q, p and y). A set of values A(x,y) is stored in a computer memory which comprises data source 50 for each of k characters. $A_k(x,y)$ is 0 when the pixel is represented by an "off" modulation state and 1 when the pixel is represented by an "on" modulation state. The complete set of alphanumeric characters, special symbols, forms, and any other sampled information (e.g., personal signatures) which is stored in the computer memory is called a font set. When a specific character, symbol, etc. of the font set is to be printed, the appropriate character matrix $A_k$ is selected and sent over a multiline data link 52 to an interface 60 which converts the electronic input to signals which are useful for controlling scan generator 40.

Figure 5:
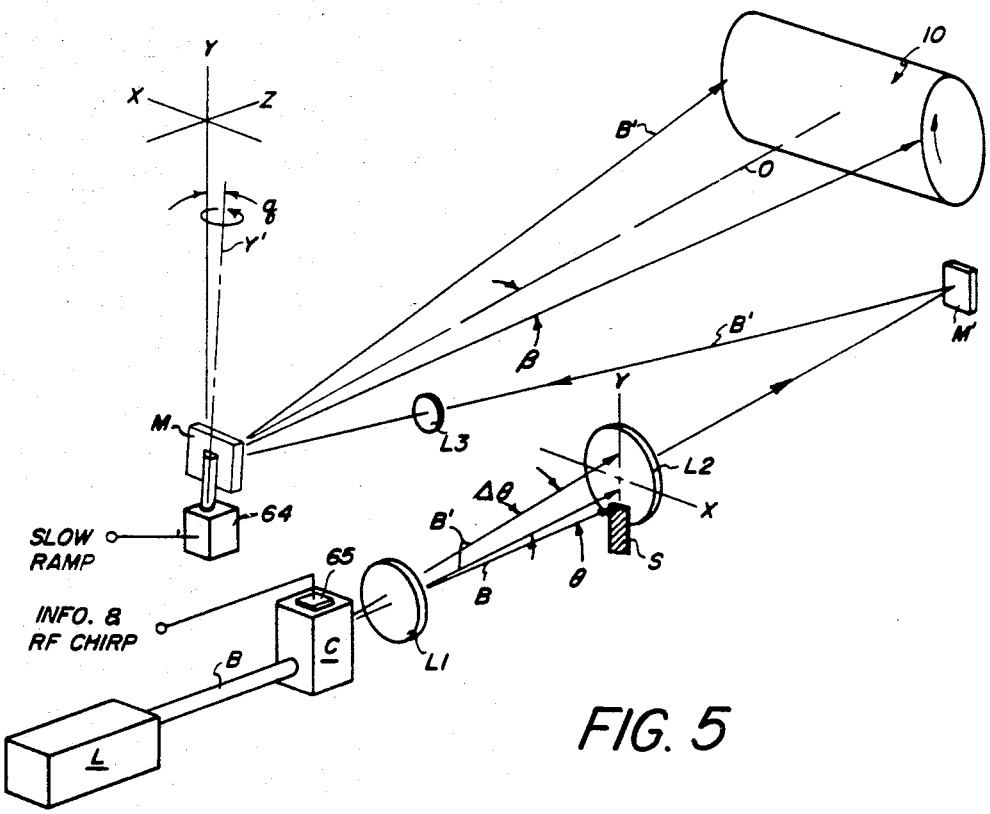
FIG. 5 is a perspective view of the optical elements comprising the laser scanner component of the laser writing system shown in FIG. 3.

In FIG. 5, optical elements of the laser scanner 30 of FIG. 3 are shown schematically. As shown, the laser scanner 30 is optically quite simple, comprising only a continuous-wave laser L, a single acousto-optic cell C, three lenses, L1, L2, L3, and a moving mirror M. A stationary mirror M' serves merely to fold the optical system to a more compact configuration. Briefly, the laser L provides the actinic radiation for exposing the photoconductive recording element 10. Acoustooptic cell C cooperates with its driving circuitry (described below) to both modulate and deflect the laser beam B to produce an intensity-modulated beam B' which is rapidly and repetitively deflected through an angular range $\Delta\theta$ in a vertical plane (i.e., in the direction of the Y-axis). Lenses L1, L2 and L3 serve to image beam B' on the recording element 10 to produce a vertical column of pixels of a desired character. Moving mirror M serves to deflect the intensity-modulated and vertically-deflected beam B' in the horizontal direction (i.e., in the direction of the X-axis) to produce a two dimensional scan raster on the recording element 10.

The acousto-optic cell C comprises an acousto-optic material, such as glass, crystal or plastic, to which an electromechanical transducer 65 (e.g. a piezoelectric quartz crystal) is acoustically coupled. The transducer 65 is responsive to an electrical drive signal applied thereto to propagate an acoustic wave within the acousto-optic medium, such wave having a frequency and amplitude corresponding to the parameters of the applied signal. As discussed above, the acoustic wave in the cell acts to diffract a portion of the incident laser beam B, incident at the Bragg angle $\theta_B$, to form a first-order diffracted beam B'. The diffraction angle $\theta$ at which the diffracted beam B' emerges from the cell is determined by the frequency of the acoustic wave propagated in the cell. The intensity of the diffracted beam is determined by the acoustic power, i.e., by the amplitude of the acoustic wave propagated in the cell. By sweeping the frequency of the signal applied to transducer 62 through a frequency range $\Delta f$, the diffracted beam is swept through an angular range $\Delta\theta$. The drive signal in this embodiment, therefore, is of the continuous frequency type referred to previously. Similarly, by varying the amplitude of the signal applied to transducer 65, the beam can be turned on and off to produce a pixel pattern representative of each column of the character matrix.

Upon being angularly deflected and intensity modulated by the acousto-optic cell, the deflected beam B' is focused by lenses L1, L2 and L3 to form an aerial image of one vertical column of the character $A_k$ on the recording element 10. A stop S serves to remove the undeflected first order beam B. It will be noted that the respective focal lengths of lenses L1 and L3 determine the vertical and horizontal scan magnifications.

Moving mirror M forms a part of a conventional mirror galvanometer 64 (e.g. a Model G300PD manufactured by General Scanning Corp.) which is driven by a relatively low frequency ramp or sawtooth signal through a galvanometer driver (e.g., a Model CCX-102 made by General Scanning Corp.). In response to such a signal, mirror M repetitively pivots about an axis y' through a predetermined angle $\beta$, and thereby acts to deflect the deflected beam B' through an angle $2\beta$, whereby the beam is scanned horizontally (i.e. in the direction of the x axis) across the width of the recording element. For each pivotal movement of mirror M, therefore, an entire line of characters is formed. While the rotational movement of the cylindrical recording element 10 may be incremental, with the increments being equal in length to the vertical stroke of the scanned beam and the incremental movement occurring during the flyback time of the mirror galvanometer 64, it is preferred to maintain continuous movement of the recording element 10. One may appreciate that this continuous movement will cause the line of characters to slant or skew relative to the axis of rotation of the mirror M. If the angle of skew is called q, it has been found that one may compensate for the skew by tilting the mirror galvanometer 64 and mirror M so that its rotational axis y' forms an angle −q with the vertical axis y.

In accordance with the present invention, a single acousto-optic cell is used to both intensity-modulate and angularly-deflect the incident laser beam. Further, the acousto-optic cell is operated such that an unexpectedly high resolution and printing speed are obtained. Specifically, a Zenith Model D-150 Acousto-optic Deflector is selected having a bandwidth ($\Delta f$) of 100 MHz and an acousto-optic velocity $V_s$ of 4.05 millimeters (mm) per microsecond ($\mu$sec). A Helium-Neon laser is used to produce a laser beam having an effective diameter variable (by means not shown) between 0.5 and 2.0 mm on the acousto-optic cell. Table I tabulates the various operating parameters of this laser writing system:

TABLE I

| | |
|---|---|
| $\Delta f$ (cell bandwidth) | 100 MHz |
| D (beam diameter) | .5 to 2.0 mm |
| $\epsilon$ (beam separation constant) | 1.34 (gaussian laser beam) |
| $V_s$ (acoustic velocity of cell | 4.05 mm/$\mu$sec (Zenith Model D-150) |

Since there are 48 pixels per column, $N_{pix}$ is equal to 48. This is in sharp contrast to the resolution parameter $N_{res}$ discussed above which represents the number of resolved spots per column. Table II compares the number of pixels per column, $N_{pix}$, with the resolution parameter $N_{res}$ for various beam diameters.

TABLE II

| $N_{pix}$ | $N_{res}$ | $\tau$ | D |
|---|---|---|---|
| 48 | 11 | .12 $\mu$sec | .5 mm |
| 48 | 21 | .25 $\mu$sec | 1.0 mm |
| 48 | 31 | .37 $\mu$sec | 1.5 mm |
| 48 | 41 | .49 $\mu$sec | 2.0 mm |

(Equations 2 and 3, discussed above, have been used to calculate the access time $\tau$ and the resolution parameter $N_{res}$.)

Figure 6:
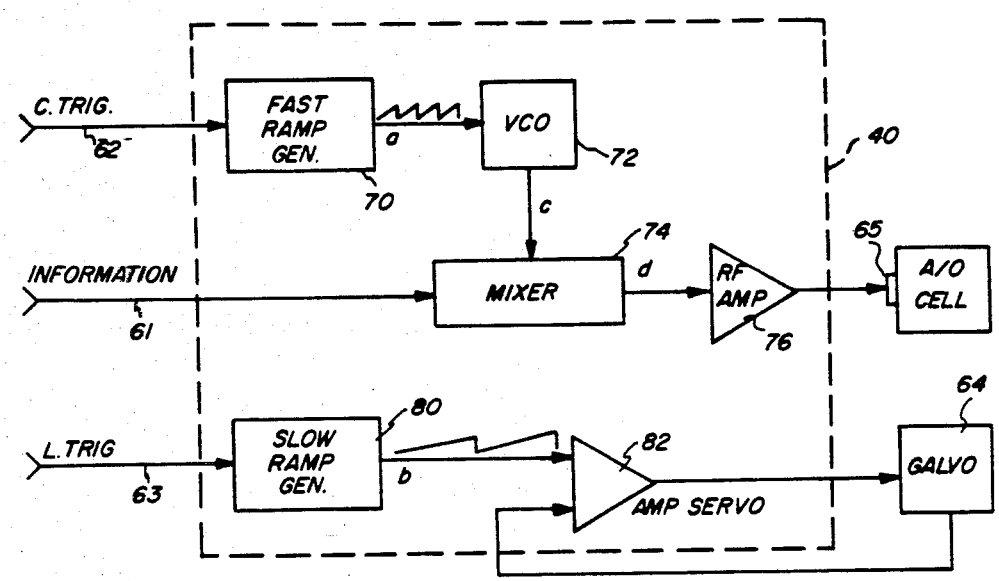
FIGS. 6 and 7 are block diagrams of the electrical circuitry comprising the scan generator and interface components of the laser writing system shown in FIG. 3.

In FIG. 6, the basic elements of the driving circuitry for the acousto-optic cell are illustrated in block diagram form. As shown, the sawtooth waveform provided by a "fast" ramp generator 70 is used to tune the output frequency of a conventional voltage-controlled oscillator (VCO) 72, such as a Wavetek 1002 manufactured by Wavetek Corporation. The initiation of each ramp of the sawtooth signal is initiated by a "column" trigger (C.TRIG.) signal provided by interface 60. As the voltage applied to the VCO increases (during the ramp portion of the sawtooth) from $V_1$ to $V_2$, the frequency of the VCO output increases from $f_1$ to $f_2$. During the flyback portion of the sawtooth, the VCO output frequency returns from $f_2$ to $f_1$ substantially instantaneously. Preferably, the frequency of the sawtooth waveform and voltages $V_1$ and $V_2$ should be such as to produce an RF "chirp" signal c which increases linearly in frequency from 100 MHz to 200 MHz (depending on the bandwidth of cell C) in 18.5 microseconds.

The output of VCO 72 is mixed, via mixing circuit 74, with an information signal 61 supplied by the data source 50 to produce an amplitude-modulated chirp. The information signal, being bi-level in nature, is either "on" or "off." Thus, the output signal d of the mixing circuit 74 is a signal which periodically increases in frequency from $f_1$ to $f_2$ and which varies in amplitude (i.e. "on" or "off") as a function of time, depending on the information to be recorded. The output of the mixing circuit 74 is amplified by a conventional RF amplifier 76 and is applied directly to the transducer 62 of the acousto-optic cell C. The frequency of the mixer output signal d determines the frequency at which the vertical scan lines are imaged on the recording element.

Also shown in FIG. 6 as a part of the scan generator 40 is circuitry for driving the mirror galvanometer 64. As shown, a sawtooth waveform b provided by the "slow" ramp generator 80 is, upon being amplified by an operational amplifier 82, used to control the pivotal position of the galvanometer. (Amplifier 82 also servos the mirror galvanometer to maintain a high degree of linearity.) It will be noted that the frequency of the sawtooth produced by the ramp generator 80 is considerably less than that produced by the ramp generator 70, such frequency being that at which a full line of text is to be printed. The ratio of the sawtooth frequencies produced by generators 70 and 80 determine the spacing between successive vertical strokes of the laser beam. The beginning of each ramp of the sawtooth signal produced by generator 80 is initiated by a "line" trigger (L.TRIG) signal 63 provided by an interface control circuit 60 (discussed below with reference to FIG. 7). The video signal 61 is blanked during the galvanometer retrace.

Figure 7:
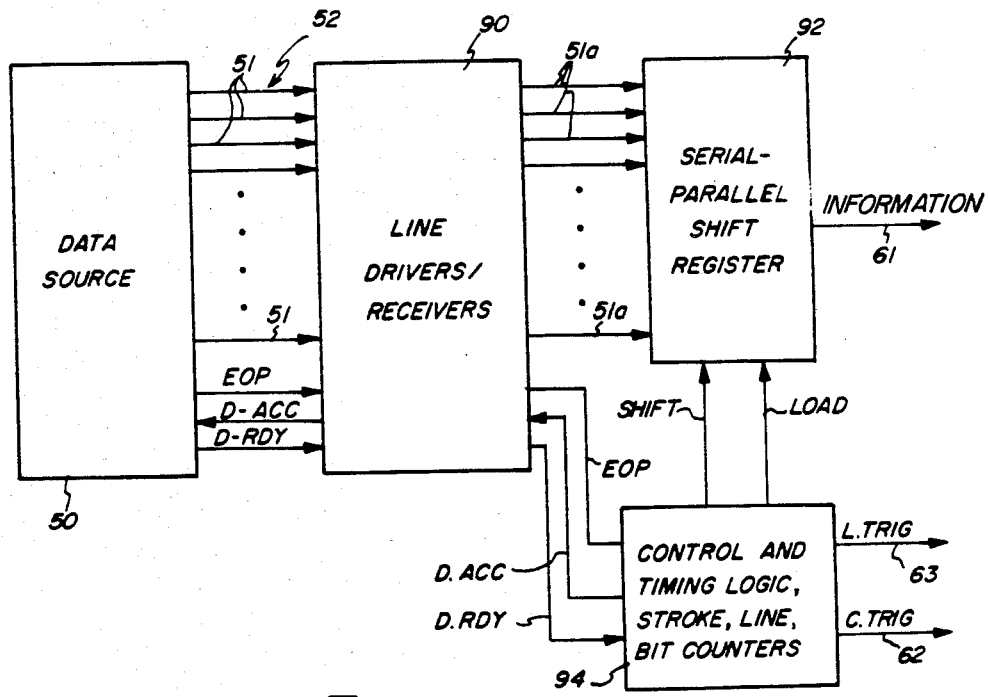

In FIG. 7, the interface control circuit 60 is shown in more detail wherein the system components used to produce the signals (i.e. signals 61, 62 and 63) for controlling the scan generator 40 are shown in block diagram form. These components include a plurality of differential line driver/receiver circuits 90 for buffer amplifying the digital signals received on sixteen data lines from the data source 50, and a serial-parallel shift register 92 for converting the buffered digital signals, received in parallel from the line driver/receiver circuits 90, to an information signal 61 comprising a continuous stream of pixel information. Three computer words (16 bits each) are collected from the data source in three sequential parallel data transfers; these words are then reformatted into a serial string of 48 bits to make up a single vertical stroke (i.e., column of pixels). The information signal 61, as mentioned above, is mixed with the chirped and frequency swept signals provided by VCO 72, and the resulting signal is used to drive the acousto-optic cell transducer 65. Appropriate blanking information (e.g. to prevent printing during column and line retrace) is also incorporated in this signal.

In addition to converting the digital signals from data source 50 to a useful format, the interface control circuit 60 supplies two gated timing signals, a column trigger (C.TRIG) signal 62 and a line trigger (L.TRIG) signal 63. The C.TRIG signal controls the timing and frequency of the sawtooth signal provided by ramp generator 70; thus, it determines the frequency at which successive vertical columns of pixels are formed. The L.TRIG signal controls the timing and frequency of the sawtooth signal provided by ramp generator 80; thus, it determines the frequency at which the galvanometer mirror pivots, and, hence, the frequency at which horizontal scans occur. Specifically, a crystalcontrolled master system clock which comprises the logic and control component 94 of the interface controls timing functions. Shift register clocking, data transfer, and horizontal and vertical timing are all synchronous with this system clock. The logic and control component 94 also includes a system of bit counters for counting data bits (pixels), vertical strokes and horizontal lines. As a bit counter counts the desired number (e.g. 48) of pixels per vertical column, a sync signal is produced (i.e., the C.TRIG signal) and applied to ramp generator 70 (FIG. 6). A stroke counter, upon counting a desired number of columns per line, produces a sync pulse (i.e. the L.TRIG signal) to the gated ramp generator 80 (FIG. 6). The stroke counter is programmable, thereby allowing a choice of galvanometer duty cycles to be employed.

Data is provided by the data source 50 on a demand basis. A data-ready (D-RDY) signal indicates a page scan sequence may be started. A data-accepted (D-ACC) signal from the control circuitry causes new words to be shifted to the computer output. After an entire page of data has been clocked through the system, an end-of-page (EOP) signal from the data source shuts down and resets the entire circuit.

Data source 50 may comprise, for example, a general purpose minocomputer (e.g. the Model PDP-11 made by Digital Equipment Corp.), a large disc memory (e.g. the 80-megabyte disc memory made by Control Data Corp.) and a teletypewriter. The computer is programmed to receive the output of the teletypewriter in the form of a stream of ASCII (American Standard Code for Interchange of Information) characters, and to convert each of the ASCII characters to the 48 pixel/column matrix, $A_k$. The $A_k$ matrix of each input character is stored in the disc memory. Conversion from ASCII to the $A_k$ matrix is effected by a conventional table look-up approach, the $A_k$ font set being stored in the computer memory. On command from the control and timing logic element 94 of interface 60, the computer outputs the appropriate $A_k$ matrix on the 16 data lines 51 in a continuous stream of 16-bit words. Since there are 48 pixels per column, each column of information requires three separate transfers into the parallel-to-serial shift registers 92. The loading and shifting of data into and out of the shift registers is controlled by the control and timing logic 94 of the interface.

To summarize the basic concepts of the present invention, alphanumeric characters and like symbols are written on a high contrast, recording material in such a manner that the actual number of pixels per column $N_{pix}$ is substantially greater than a resolution parameter $N_{res}$ which denotes the number of resolved spots per column as computed from Equation 3. This is achieved by a reduction of the access time $\tau$ (brought about by a reduction in the diameter of the laser beam incident on the acousto-optic cell), while turning the beam "on" and "off" fast enough to cause $N_{pix}$ to be substantially greater than $N_{res}$. A further increase in speed results, without an adverse effect on image quality, from violating the "zeta rule" and making the pixel time $T_{pix}$ approximately equal to the access time $\tau$. It will be apparent to those skilled in the art that these aspects of the invention can be practiced separately or in combination.

The invention has been described in detail with particular reference to certain preferred embodiments thereof, but it will be understood that variations and modifications can be effected within the spirit and scope of the invention.

What is claimed is:

1. Apparatus for use in angularly deflecting and intensity modulating an incident laser beam comprising:
    (a) an acousto-optic cell controllable by a drive signal for angularly deflecting and intensity modulating a laser beam incident thereon having an effective diameter D;
    (b) means for producing a drive signal which varies in frequency over a range $\Delta f$ to cause the incident laser beam to be deflected through an angular range $\Delta\theta$; and
    (c) means, operable during the variation of the drive signal through said frequency range $\Delta f$, for varying the amplitude of the drive signal in accordance with a number of pixels $N_{pix}$ of information, said number of pixels ($N_{pix}$) being substantially greater than a resolution parameter $N_{res}$ defined as $$N_{res} = \frac{\Delta f D}{\epsilon V_s} + 1,$$

where $V_s$ is the acoustic velocity of said acousto-optic cell, and $\tau$ is the beam separation constant.

2. Apparatus as claimed in claim 1 wherein said drive signal producing means includes means for producing a drive signal comprised of a series of frequency components, each of which frequency components is effective to cause the incident laser beam to be deflected along a respective angular direction.

3. Apparatus as claimed in claim 1 wherein said drive signal producing means includes means for producing a drive signal that is continuously variable in frequency over the frequency range $\Delta f$ for causing the incident laser beam to be continuously deflected through the angular range $\Delta\theta$.

4. Apparatus as claimed in claim 1 wherein the time $T_c$ taken taken for the incident laser beam to be deflected through the angular range $\Delta\theta$ divided by the number of pixels $N_{pix}$ is approximately equal to the access time $\tau$ of said acousto-optic cell which is defined as $$\tau = D/V_s.$$

5. Apparatus as claimed in claim 4 wherein said drive signal producing means includes means for producing a drive signal comprised of a series of frequency components, each of which frequency components is effective to cause the incident laser beam to be deflected along a respective angular direction.

6. Apparatus as claimed in claim 4 wherein said drive signal producing means includes means for producing a drive signal that is continuously variable in frequency over the frequency range $\Delta f$ for causing the incident laser beam to be continuously deflected through the angular range $\Delta\theta$.

7. Apparatus for use in controlling the operation of a laser beam to expose information on a high contrast recording material disposed at an image plane, said apparatus comprising:
    (a) acousto-optic cell means characterized by an acoustic velocity $V_s$ for angularly deflecting and intensity modulating an incident laser beam having an effective diameter D;
    (b) means for producing a drive signal to control the operation of said acousto-optic cell, said drive signal varying in frequency over a range $\Delta f$ to cause the incident laser beam to be deflected through an angular range $\Delta\theta$;
    (c) means for varying the amplitude of the drive signal to cause the deflected laser beam to be intensity modulated in accordance with a number of pixels $N_{pix}$ of information as the laser beam is deflected through the angular range $\Delta\theta$, the number of pixels $N_{pix}$ being substantially greater than a resolution parameter $N_{res}$ defined as $$N_{res} = \frac{\Delta f D}{\epsilon V_s} + 1,$$

where $\epsilon$ is the beam separation constant; and
    (d) means for focusing the deflected and modulated laser beam in the image plane to cause the laser beam to scan across the image plane and to expose information on the high contrast recording material disposed thereat.

8. Apparatus as claimed in claim 7 wherein said drive signal producing means includes means for producing a drive signal comprised of a series of frequency components, each of which frequency components is effective to cause the incident laser beam to be deflected along a respective angular direction.

9. Apparatus as claimed in claim 8 wherein said amplitude varying means includes means for producing an information signal representative of alphanumeric characters and/or like symbols, and means for modulating the amplitude of said frequency components in accordance with said information signal.

10. Apparatus as claimed in claim 9 further comprising means for adjusting the effective diameter D of the incident laser beam.

11. Apparatus as claimed in claim 7 wherein said drive signal producing means includes means for producing a drive signal that is continuously variable in frequency over the frequency range $\Delta f$ for causing the incident laser beam to be continuously deflected through the angular range $\Delta \theta$.

12. Apparatus as claimed in claim 11 wherein said amplitude varying means includes means for producing an information signal representative of alphanumeric characters and/or like symbols, and means for modulating the amplitude of said frequency components in accordance with said information signal.

13. Apparatus as claimed in claim 12 further comprising means for adjusting the effective diameter D of the incident laser beam.

14. Apparatus as claimed in claim 7 comprising the further improvement wherein the time $T_c$ taken taken for the incident laser to be deflected through the angular range $\Delta \theta$ divided by the number of pixels $N_{pix}$ is approximately equal to the access time $\tau$ of said acousto-optic cell which is defined as $$\tau = D/V_s.$$

15. Laser control apparatus for use in angularly deflecting and intensity modulating a laser beam comprising:
  (a) an acousto-optic cell for angularly deflecting and intensity modulating, in response to a drive signal applied thereto, a laser beam incident thereon and having an effective diameter D;
  (b) means for focusing said deflected beam in an image plane to cause said laser beam to scan across said image plane upon being deflected by said acousto-optic cell;
  (c) means for producing a drive signal that varies in frequency through a range $\Delta f$ that is effective to cause the incident laser beam to scan a length L across the image plane; and
  (d) means for varying the amplitude of the drive signal to cause the deflected laser beam to be intensity modulated in accordance with a number of pixel $N_{pix}$ of information while the deflected beam is scanned across the length L in the image plane, the number of pixels $N_{pix}$ being substantially greater than a resolution parameter $N_{res}$ defined as $$N_{res} = \frac{\Delta f D}{\epsilon V_s} + 1,$$

where $V_s$ is the acoustic velocity of said acousto-optic cell and $\epsilon$ is the beam separation constant.

16. Apparatus as claimed in claim 15 wherein said amplitude varying means includes (1) means for producing an information signal representative of information to be exposed in the image plane, and (2) means for amplitude modulating the deflection signal in accordance with said information signal.

17. Apparatus as claimed in claim 16 wherein said information signal producing means includes means for producing an information signal representative of alphanumeric characters and/or like symbols.

18. Apparatus as claimed in claim 17 wherein said drive signal producing means includes means for producing a drive signal comprised of a series of frequency components, each of which frequency components is effective to cause the incident laser beam to be deflected along a respective angular direction.

19. Apparatus as claimed in claim 18 comprising the further improvement wherein said drive signal producing means includes means for producing a drive signal that is continuously variable in frequency over the frequency range $\Delta f$ for causing the incident laser beam to be continuously deflected through the angular range $\Delta \theta$.

20. Apparatus as claimed in claim 15 comprising the further improvement wherein the time $T_c$ taken for the incident laser to be deflected through the angular range $\Delta \theta$ divided by the number of pixels $N_{pix}$ is approximately equal to the access time $\tau$ of said acousto-optic cell which is defined as $$\tau = D/V_s.$$

21. Laser writing apparatus for use in writing alphanumeric characters and/or like symbols on a high contrast recording material disposed at an image plane, said apparatus comprising:
  (a) an acousto-optic cell for intensity modulating and angularly deflecting, in response to a drive signal applied thereto, a laser beam incident thereon having an effective diameter D;
  (b) means for producing a laser beam incident on said acousto-optic cell;
  (c) means for focusing said modulated and deflected laser beam in said image plane so that said focused beam will be scanned across said image plane upon deflection by said acousto-optic cell;
  (d) means for producing an information signal containing alphanumeric character and/or like symbol information;
  (e) means for producing a drive signal which varies in frequency over a range $\Delta f$ to cause the incident laser beam to be deflected through an angular range $\Delta \theta$; and
  (f) means for varying the amplitude of said drive signal in accordance with said information signal to cause the intensity of the deflected laser beam to vary in accordance with a number of pixel $N_{pix}$ of information per angular range $\Delta \theta$, being substantially greater than a resolution parameter $N_{res}$ defined by $$N_{res} = \frac{\Delta f D}{\epsilon V_s} + 1,$$

where $V_s$ is the acoustic velocity of said acousto-optic cell and $\tau$ is the beam separation constant.

22. Apparatus as claimed in claim 21 wherein said drive signal producing means includes means for producing a drive signal that is continuously variable in frequency over the frequency range $\Delta f$ for causing the incident laser beam to be continuously deflected through the angular range $\Delta\theta$.

23. Apparatus as claimed in claim 21 wherein said drive signal producing means includes means for producing a drive signal comprised of a series of frequency components, each of which frequency components is effective to cause the incident laser beam to be deflected along a respective angular direction.

24. Apparatus as claimed in claim 21 comprising the further improvement wherein the time $T_c$ taken taken for the incident laser to be deflected through the angular range $\Delta\theta$ divided by the number of pixels $N_{pix}$ is approximately equal to the access time $\tau$ of said acousto-optic cell which is defined as $$\tau = D/V_s.$$

25. A method of controlling a laser beam of effective diameter D which is incident on an acousto-optic cell characterized by an acoustic velocity $V_s$, said method comprising the steps of:
 (a) applying to the acousto-optic cell a drive signal that varies in frequency over a range $\Delta f$ to cause the incident laser beam to be deflected through an angular range $\Delta\theta$;
 (b) varying the amplitude of the drive signal so that the intensity of the deflected laser beam is modulated in accordance with a number of pixels $N_{pix}$ of information while the laser beam is deflected through the angular range $\Delta\theta$, the number of pixels $N_{pix}$ being substantially greater than a resolution parameter $N_{res}$ defined by $$N_{res} = \frac{\Delta f D}{\epsilon V_s} + 1,$$

where $\epsilon$ is the beam separation constant and $V_s$ is the acoustic velocity of the acousto-optic cell; and
 (c) focusing the deflected beam in an image plane to expose alphanumeric characters and/or like symbols on a recording material disposed thereat.

26. A method as claimed in claim 25 wherein the amplitude of the drive signal is varied in accordance with an information signal representative of alphanumeric characters and/or like symbols.

27. A method of recording alphanumeric characters and/or like symbols, said method comprising the steps of:
 (a) focusing a laser beam having an effective diameter D on an acousto-optic cell characterized by an acoustic velocity $V_s$;
 (b) applying to the acousto-optic cell a drive signal that varies in frequency over a range $\Delta f$ to cause the incident laser beam to be deflected through an angular range $\Delta\theta$;
 (c) varying the amplitude of the drive signal so that the intensity of the deflected laser beam is modulated in accordance with a number of pixels $N_{pix}$ of information corresponding to alphanumeric characters and/or like symbols while the laser beam is deflected through the angular range $\Delta\theta$, the number of pixels $N_{pix}$ being substantially greater than a resolution parameter $N_{res}$ defined by $$N_{res} = \frac{\Delta f D}{\epsilon V_s} + 1,$$

where $\epsilon$ is the beam separation constant and $V_s$ is the acoustic velocity of the acousto-optic cell;
 (d) focusing the deflected and modulated laser beam in the image plane to expose alpha-numeric characters and/or like symbols on a high contrast recording material disposed thereat; and
 (e) developing the exposed image on such high contrast material.

* * * * *